Jan. 23, 1923.
E. B. RICHMOND.
HEADLIGHT.
FILED SEPT. 30, 1920.
1,443,041
3 SHEETS-SHEET 2
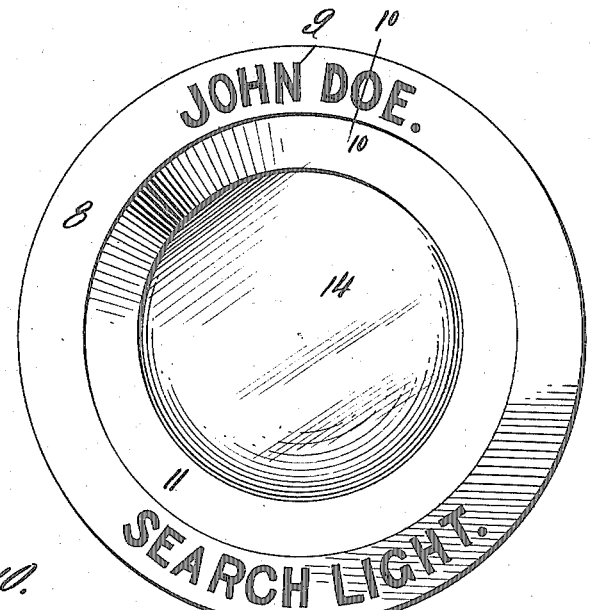
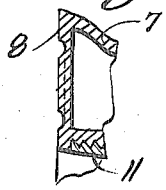
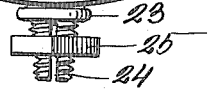
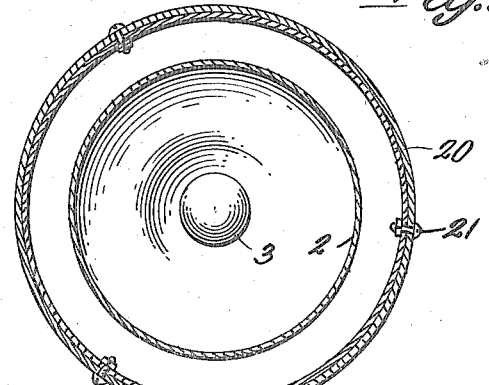
WITNESSES
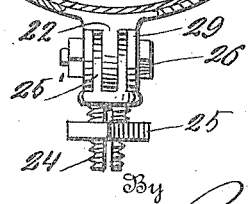
Inventor
EVERETT B. RICHMOND
By
Attorney

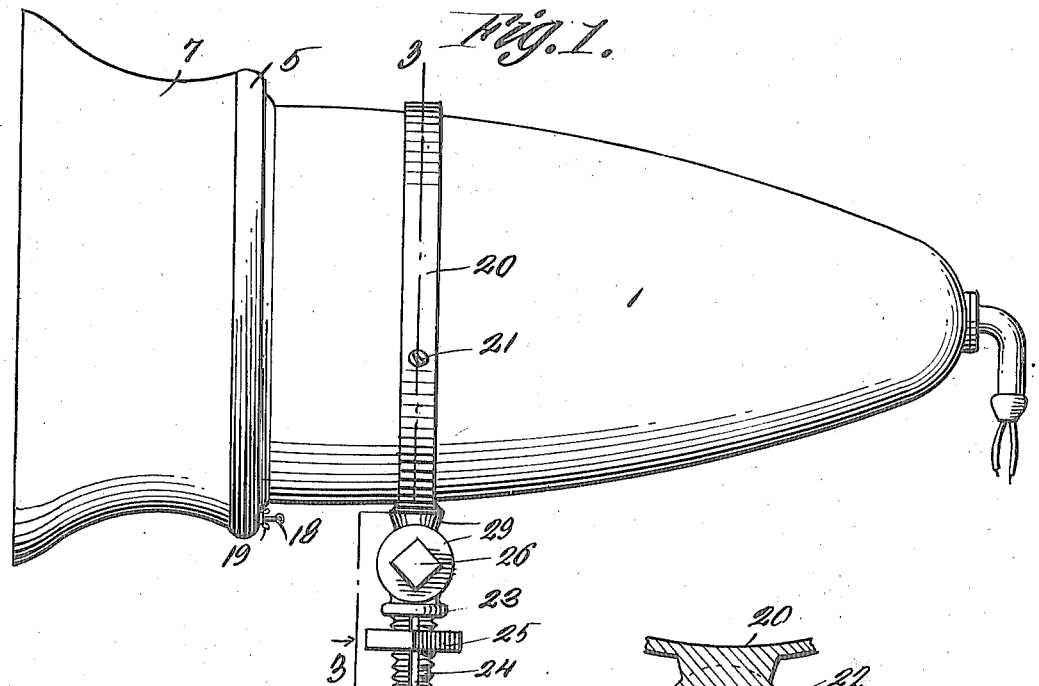
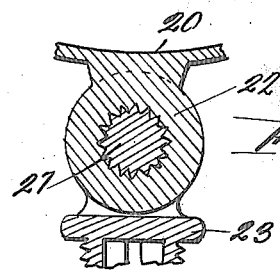
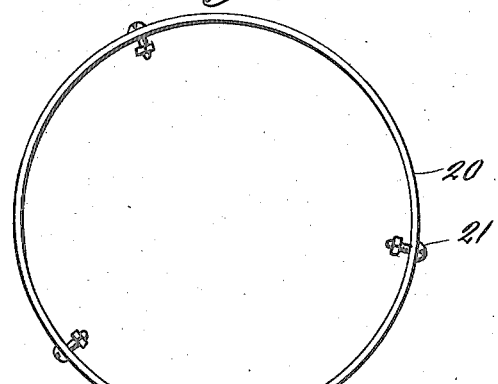
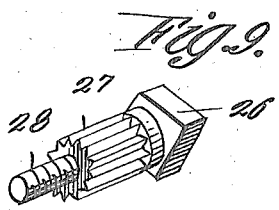
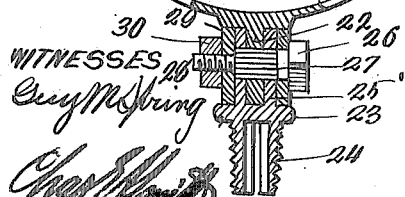

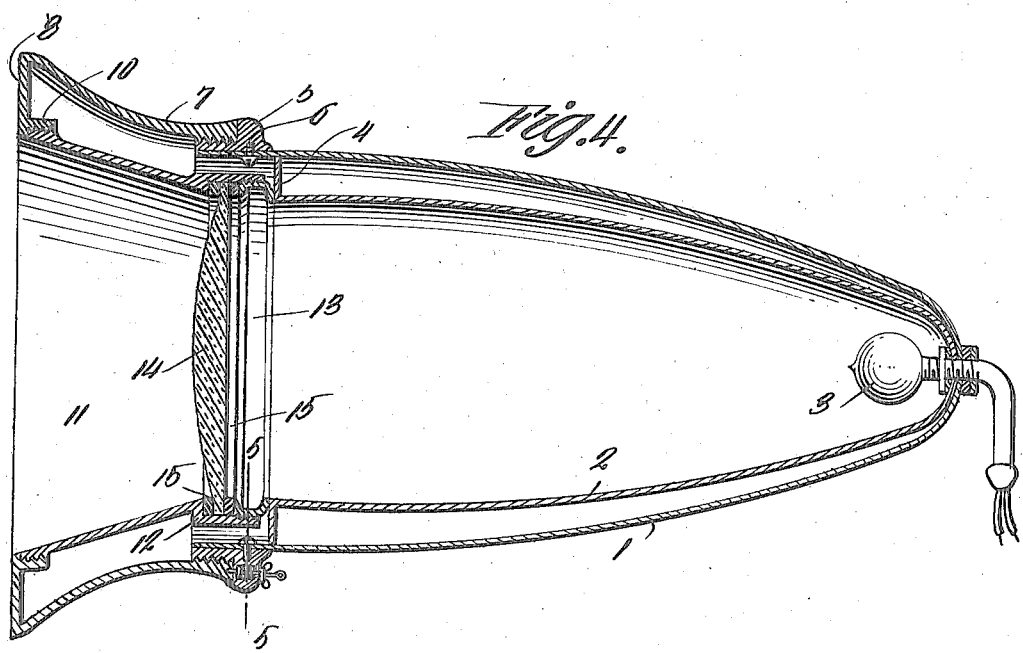
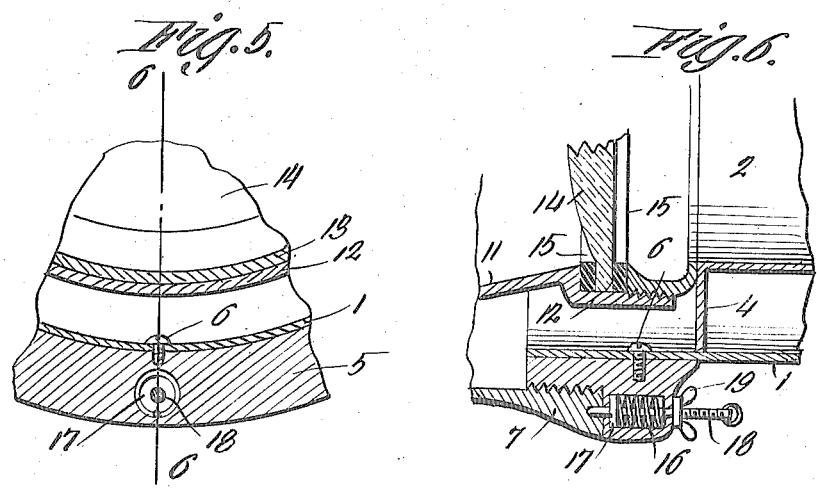

Patented Jan. 23, 1923.

1,443,041

UNITED STATES PATENT OFFICE.

EVERETT B. RICHMOND, OF HARTFORD, CONNECTICUT, ASSIGNOR OF ONE-HALF TO PATRICK J. WILLIAMS, OF HARTFORD, CONNECTICUT.

HEADLIGHT.

Application filed September 30, 1920. Serial No. 413,692.

*To all whom it may concern:*

Be it known that I, EVERETT B. RICHMOND, a citizen of the United States, residing at Hartford, in the county of Hartford and State of Connecticut, have invented certain new and useful Improvements in a Headlight, of which the following is a specification.

This invention relates to a headlight which is especially adapted for illuminating the pathways of automobiles, street cars, locomotives, steam ships and other like vehicles so as to throw a powerful light which will be concentrated directly upon the pathway of a vehicle. The headlight is constructed so that the rays will be collected and with the aid of a powerful bull's eye lens magnified and concentrated a relatively long distance ahead of the vehicle. A lens closure is provided for the headlight which will efficiently prevent the atmosphere from tarnishing the reflector and at the same time prevent dust from accumulating thereon. I have also provided a simple and efficient bracket which will allow the headlight to be adjusted at various angles and when the headlight is positioned at the desired angle it will be prevented from jarring to another angle.

The general object of the invention is to improve upon headlights of this character by providing a device which will be extremely simple, durable and inexpensive construction, one which is efficient and reliable in operation, and well adapted to the purposes for which it is designed.

With the above and numerous other objects in view, the invention resides in certain novel features of construction and the combination and arrangement of parts as will be hereinafter fully described and claimed.

In the drawing:—

Figure 1 is a side elevation of the headlight,

Figure 2 is a front elevation of the headlight,

Figure 3 is a section taken on the line 3—3 of Figure 1 looking in the direction of the arrow, Figure 4 is a central longitudinal section taken through the headlight, Figure 5 is an enlarged section taken on the line 5—5 of Figure 4, Figure 6 is a section taken on the line 6—6 of Figure 5, Figure 7 is a front elevation of the bracket showing the lower portion thereof in section, Figure 8 is a fragmentary sectional view through the lower portion of the bracket, Figure 9 is a detailed perspective view of a pin used with the bracket, and Figure 10 is a section taken on the line 10—10 of Figure 2.

Referring to the accompanying drawings by numeral it will be seen that 1 designates a casing in which is situated the reflector 2. This reflector 2 is parabolic in longitudinal cross section as is shown in Figure 4 of the drawing and has a length which is three times the size of its largest diameter. The casing 1 conforms in shape to the reflector 2 and is situated a spaced distance therefrom so that any accidental knocks which may be received by the casing will not dent the reflector 2. A lamp socket is situated within the casing 1 and reflector 2 so as to receive the electric bulb 3 in any suitable and well known manner. The outer end of the reflector 2 is provided with the outwardly disposed flange 4 which engages the casing 1 so as to hold the same in spaced relation thereto. The casing 1 extends a relatively short distance beyond the flange 4 and upon this extension of the casing 1 there is situated a collar 5 which is held in place by means of the screws 6 or any other suitable means. The inner portion of this collar 5 is enlarged so as to form a shoulder while the forward portion is threaded for receiving the lens closure 7. The inner end of the lens closure 7 is provided with internal threads which engage the threads provided upon the collar 5. The lens closure 7 is flared outwardly and at its end is provided with a flange 8 that extends at right angles to the longitudinal axis of the reflector 2. This flange 8 is constructed so as to be used as a name plate or for advertising purposes and the letters 9 are sunken therein as shown in detail in Figure 10 of the drawing. An inward extension 10 is provided upon the flange 8 and has internal threads for receiving the threads provided upon the outer end of the tapered cylinder 11. This tapered cylinder 11 is provided with an off-set portion 12 at its smaller end. The off-set portion 12 is provided with internal threads for receiving the threads of a locking ring 13. The offset portion 12 forms a shoulder between itself and the tapered cylinder 11 and between this shoulder and the locking ring 13 a bull's eye lens 14 is disposed. Gaskets 15 are disposed between the lens 14 and the shoulders and the ring 13.

At a point upon the enlarged portion of the collar 5 a bore 16 is provided, in which is situated a washer 17. A pin 18 passes through an aperture provided in the washer 17 and through the bore 16. The outer portion of the pin 18 is threaded so as to receive the thumb nut 19. The inner end of the pin 18 engages an indenture provided in the lens closure 7 when same is screwed to a closed position. Thus it will be seen that this pin 18 will prevent the lens closure 7 from being jarred loose and when it is desired to remove the lens closure the thumb nut 19 may be screwed so as to pull the pin outwardly so that the inner end thereof will not engage the indenture in the lens closure 7.

The tapered cylinder 11 is painted black or any other non-reflecting color thus avoiding any side glare which would be reflected from the rays coming through the lens.

The bracket used in connection with the headlight just described comprises the ring 20 which is disposed around the casing 1 intermediate its ends and is fixed thereto by means of bolts 21 or any other suitable means. The base of the ring 20 is provided with the depending apertured ear 22 and the aperture thereof is provided with a serrated surface. The member 23 which will be mounted upon the vehicle by means of the threaded shank 24 and nut 25 is provided with the spaced apart apertured ear 25' for receiving the ear 22 therebetween so that all the apertures thereof will register with one another. The surfaces of the apertures in the ears 25' are also serrated. A pin 26 is provided with a head having thereon the serrated shank 27 extending from which is the threaded stem 28. The serrated shank 27 is received within the apertures in the ears 22 and 25' and washers 29 are disposed on the pin 26 upon the outside of the ears 25' so that the nut 30 may be screwed tightly upon the threaded stem 28 and bear against one of the washers 29 thus holding the serrated shank 27 in firm engagement with the serrated surfaces of the apertures in the ears 22 and 25'. Thus it will be readily seen that the ring 20 may be adjusted at any desirable angle in relation to the member 23. The threaded shank 24 of the member 23 is slotted and tapered so that when the nut 25 is screwed in position it will be locked in engagement with the shank 24 thus preventing the accidental removal thereof.

From the foregoing description, taken in connection with the accompanying drawings, the construction and operation of the device will be readily understood without a more extended explanation. As numerous changes in form, proportion, and in the minor details of construction, may be resorted to without departing from the spirit of this invention, I do not wish to be limited to the construction herein shown and described other than as claimed.

Having thus described my invention what I claim as new is:—

1. In a headlight of the class described, a reflector, a casing surrounding said reflector and spaced therefrom and having its forward end extending therebeyond, a flange provided upon the forward end of the reflector for holding the casing in spaced relation thereto, a collar fixed upon the forward portion of the casing and provided with threads, a lens closure provided with threads for engaging the threads on said collar, said lens closure provided with a flange at its forward end extending at right angles to the longitudinal axis of the reflector, a tapered cylinder carried by the lens closure having a non-reflecting surface, and a lens carried by the tapered cylinder.

2. In a headlight of the class described, a reflector, a casing surrounding said reflector and spaced therefrom and having its forward end extending therebeyond, means provided on the forward end of the reflector for holding the casing in spaced relation thereto, a lens closure threadedly mounted on the forward end of the casing and provided with a flange at its forward end extending at right angles to the longitudinal axis of the reflector, a tapered cylinder carried by the lens closure, and a lens carried by the tapered cylinder.

In testimony whereof I affix my signature in presence of two witnesses.

EVERETT B. RICHMOND.

Witnesses:
EMILY TRAUTE,
MARION L. DUNNELTZ.